UNITED STATES PATENT OFFICE.

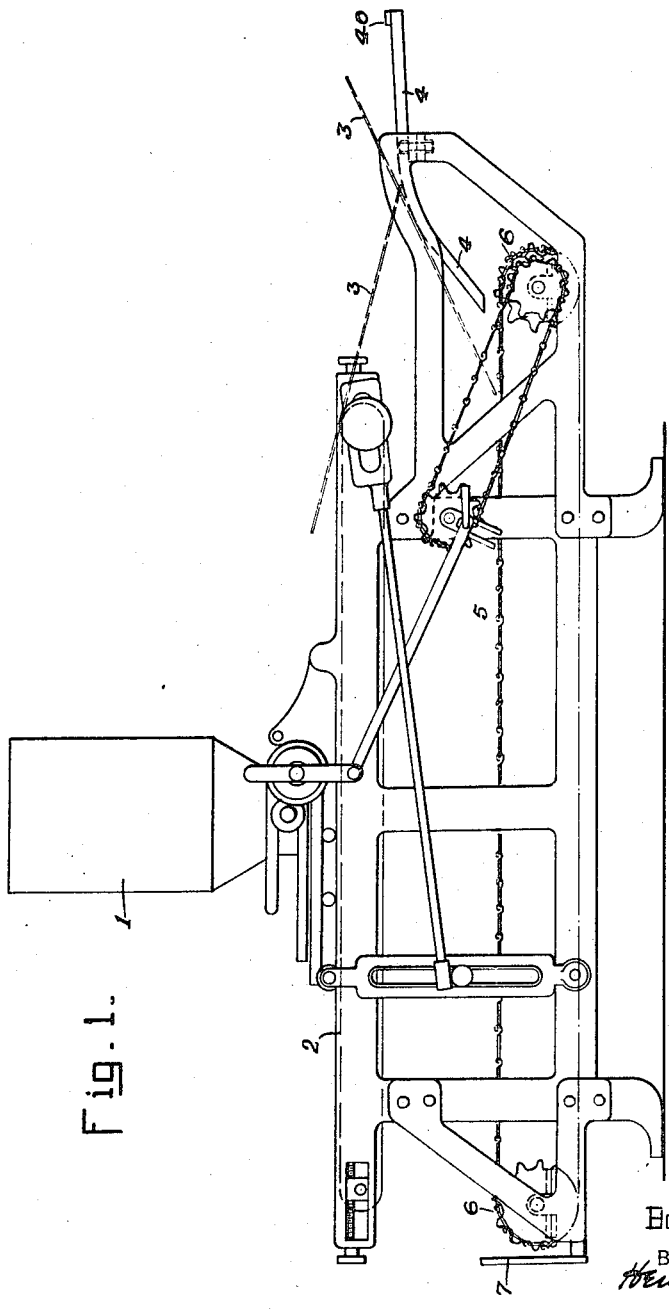

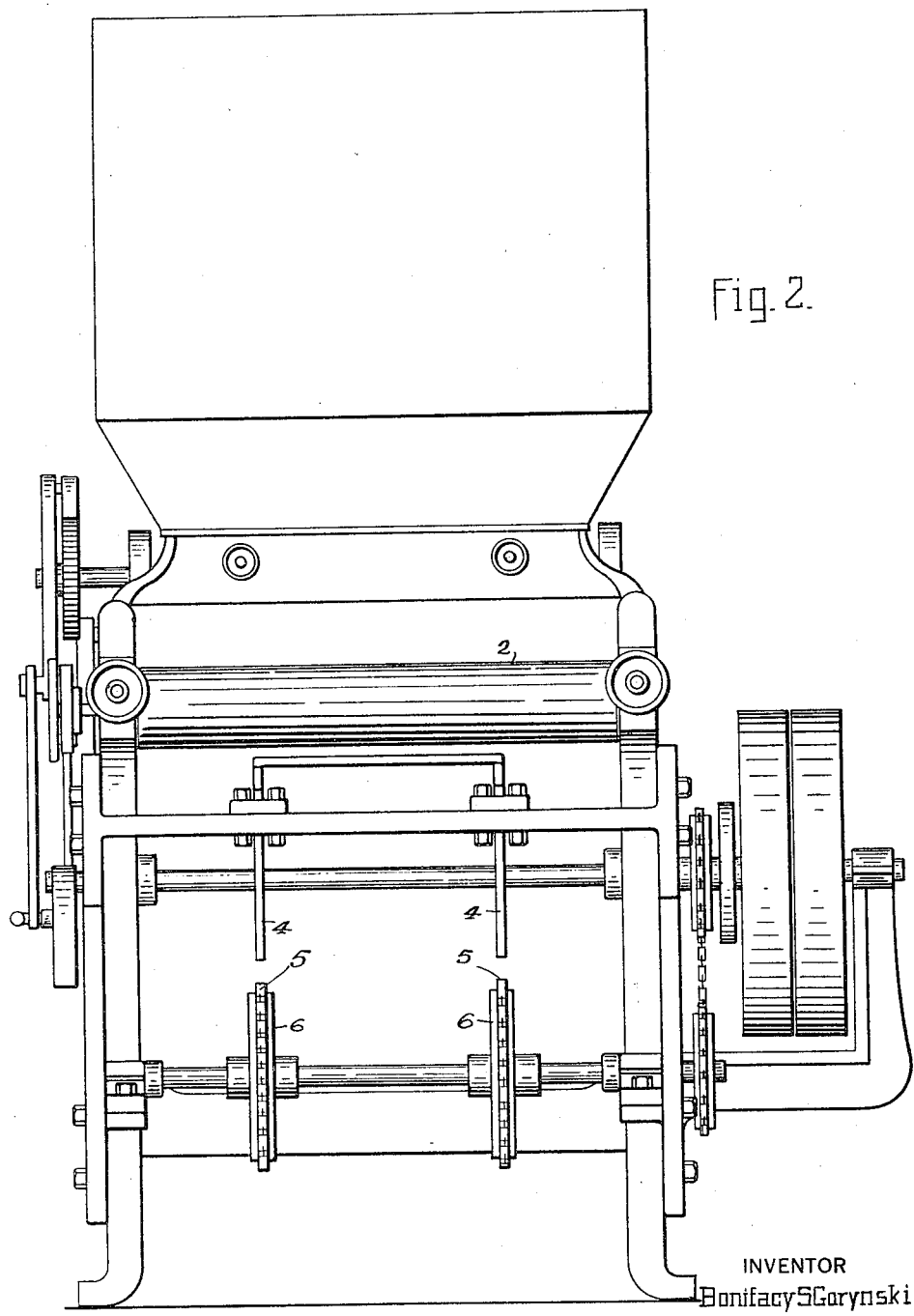

BONIFACY S. GORYNSKI, OF SEATTLE, WASHINGTON, ASSIGNOR OF ONE-HALF TO HOYT'S INCORPORATED, OF SEATTLE, WASHINGTON, A CORPORATION OF WASHINGTON.

PAN-RETURNING DEVICE FOR CAKE-DEPOSITING MACHINES.

1,289,443.     Specification of Letters Patent.      Patented Dec. 31, 1918.

Application filed July 3, 1918. Serial No. 243,206.

*To all whom it may concern:*

Be it known that I, BONIFACY S. GORYNSKI, a citizen of the United States, and resident of the city of Seattle, county of King, and State of Washington, have invented certain new and useful Improvements in Pan-Returning Devices for Cake-Depositing Machines, of which the following is a specification.

My invention relates to machines which are used in depositing cookies and other small cakes upon pans preliminary to baking and consists of a mechanism which is applied to such machines and serves as a return conveyer for the pans, whereby, after the cookies or cakes have been deposited upon the pans, the pans are returned to the operator who supplies the empty pans to the machine, thereby making it possible for one man both to supply the pans to the machine and to take care of the pans as they have been re-filled, without moving away from one point.

The object of my machine is to provide means whereby one man may operate such a machine as that described and without having to alternately go from end to end of the machine. It thus enables a saving of labor and also an increase in the capacity of the machine.

The features of the device which I consider to be novel and upon which I desire a patent, will be first described and then particularly defined by the claims which terminate this specification.

In the accompanying drawings, I have shown, in outline, a machine of the kind referred to, having my invention incorporated therein, the same being by means of a simple construction which I now prefer to use.

Figure 1 is a side elevation of the machine showing my invention applied thereto.

Fig. 2 is an end elevation of the same machine.

In machines of the type referred to, the usual construction embodies an elevated reservoir or tank in which the dough, or batter, which is employed for making the cakes or cookies, is stored and from which measured quantities are discharged at regular intervals, usually as a series of cakes forming a line across the pan. The pan is placed beneath this reservoir where it will receive the dough from which the cookies are to be made by a mechanism as described, and is fed forward, either by continuous regular motion, or by an intermittent movement, thus depositing a series of rows of cakes upon the pan.

In the drawing, 1 represents the reservoir or tank which contains the dough or batter from which the cakes are made. The means for expelling the cakes, not forming any part of my present invention, has not been illustrated in detail. There are numerous well-known ways of doing this and my invention is capable of operating with equal success upon machines employing any of these ways.

The machine shown has an endless conveyer 2, which may be either a belt, or chains, which is moved from the left hand end of the machine, as shown in Fig. 1, toward the right hand end thereof, carrying with it the pans which are placed thereon. Two successive positions of a pan are shown by broken lines in 3 in Fig. 1, these showing positions which will be occupied by the pan just previous to and at the time of transfer from the upper to the lower conveyer.

It is evident that as the pan passes slowly beneath the reservoir 1, that if a series of small portions of dough or batter be discharged from this reservoir, it will form upon the pan a number of rows of cakes. At the opposite or discharging end of this machine, the pan, if not removed or restrained in some way, will be projected beyond the end of the conveyer until the outer or projecting end overbalances the remainder of the pan and it topples over. At this point, I provide a table or apron 4, which may consist of a plate or a series of fingers, which catch the outer edge of the pan and sustain it until the rearmost edge of the pan is forced beyond the conveyer and drops down. The position occupied by the pan just after its outer edge has fallen down in contact with the transfer table, is shown by broken lines in Fig. 1. After the pan has been forced outward to the point where its rearmost edge drops off the conveyer, it will assume the position shown by the other set of broken lines.

The end of the transfer table which is toward the machine and the endless conveyer 2, is curved downward, after the manner clearly shown in Fig. 1. In consequence, when the pan has been entirely discharged from the end of the conveyer, it rocks over the curved surface of this transfer table and is thus eased down until its inner edge contacts with the upper run of the returning conveyer 5.

This returning conveyer is in the nature of a belt or chains, passing over wheels or pulleys 6, at opposite ends of the machine. This conveyer is located in the lowermost portions of the frame of the machine and leads back to the end where the operator stands and where the pan was originally placed upon the upper conveyer 1. In consequence, the man who places the pans in the machine can also remove the filled pans and without having to depart from the position occupied while feeding the machine. It is thus possible for one man to both feed the pans to the machine and remove the filled pans from the machine, as fast as it can be operated. It thus enables a saving of the labor of one man.

To prevent the pans on the return movement from being discharged from the return end of the lowermost or return elevator, I may provide a stop, or stops, in the nature of a board or pins located at 7, which will stop the further movement of the pan and keep it upon the conveyer until it is removed by hand.

To prevent the possibility of the pan being forced outward on the receiving and transfer table 4, farther than would be desired, I provide a stop for the end of the pan, the same being herein shown as consisting of a bar 40, which extends across the outer edge of this table. This is placed at such a distance from the adjacent end of the conveyer 2, that the pan will strike this at about the time, or just after, it has cleared the end of the conveyer.

What I claim as my invention is:

1. In a cake depositing machine, in combination, a conveyer for the pans being filled, located at the top of the machine, transfer bars at the delivery end of said conveyer located somewhat below the upper surface of and having their ends toward said conveyer curving downwardly and under this conveyer, and a return conveyer receiving the pans from said transfer bars and conveying them through the lower part of the machine to its opposite end.

2. In a cake depositing machine, a conveyer for the pans being filled, a return conveyer leading back to the starting point operating at a lower level, and a transfer mechanism comprising bars located between the levels of said conveyers and having substantially horizontal outer sections and a downwardly curved inner section extending to the receiving end of the return conveyer.

Signed at Seattle, Washington, this 26th day of June, 1918.

BONIFACY S. GORYNSKI.

Copies of this patent may be obtained for five cents each, by addressing the "Commissioner of Patents, Washington, D. C."